United States Patent
Liu

(10) Patent No.: US 7,441,907 B2
(45) Date of Patent: Oct. 28, 2008

(54) LIGHT SOURCE DRIVING METHOD

(75) Inventor: Chin-Ku Liu, Hsinchu (TW)

(73) Assignee: Coretronic Corporation, Hsinchu (TW)

( * ) Notice: Subject to any disclaimer, the term of this patent is extended or adjusted under 35 U.S.C. 154(b) by 0 days.

(21) Appl. No.: 11/780,491

(22) Filed: Jul. 20, 2007

(65) Prior Publication Data

US 2008/0074627 A1    Mar. 27, 2008

(30) Foreign Application Priority Data

Sep. 21, 2006    (TW) ............................. 95134916 A

(51) Int. Cl.
  G03B 21/20    (2006.01)
  G03B 21/26    (2006.01)
  G03B 21/00    (2006.01)
  H04N 9/12     (2006.01)
  H04N 5/64     (2006.01)

(52) U.S. Cl. .................. 353/85; 353/94; 353/121; 348/742; 348/744

(58) Field of Classification Search .............. 353/31, 353/85, 94, 99, 121; 348/742–744, 771; 359/497; 345/76

See application file for complete search history.

(56) References Cited

U.S. PATENT DOCUMENTS

| 6,140,983 A | 10/2000 | Quanrud .................. 345/55 |
| 6,801,213 B2 | 10/2004 | Bergstrom et al. ......... 345/596 |
| 7,147,331 B2 * | 12/2006 | Yamazaki et al. ............ 353/31 |
| 2005/0254127 A1 * | 11/2005 | Evans et al. ................. 359/497 |
| 2007/0103405 A1 * | 5/2007 | Kwak et al. ................. 345/76 |

* cited by examiner

Primary Examiner—Melissa Jan Koval
(74) Attorney, Agent, or Firm—Jianq Chyun IP Office

(57) ABSTRACT

A light source driving method for controlling a first and a second light source assembly of a projection apparatus to turn on and off at least once during each 1/n frame time is provided. The first light source assembly includes first color light sources and third color light sources, while the second light source assembly includes second color light sources. The light source driving method includes following steps: turning on and off the first color light sources once sequentially in a first sub-frame period; turning on and off a part of the second color light sources once synchronously in a second sub-frame period; turning on and off the other second color light sources once synchronously in a third sub-frame period; and turning on and off the third color light sources once sequentially in a fourth sub-frame period.

7 Claims, 5 Drawing Sheets

LIGHT SOURCE DRIVING METHOD

CROSS-REFERENCE TO RELATED APPLICATION

This application claims the priority benefit of Taiwan application serial no. 95134916, filed Sep. 21, 2006. All disclosure of the Taiwan application is incorporated herein by reference.

BACKGROUND OF THE INVENTION

1. Field of the Invention

The present invention relates to a light source driving method. More particularly, the present invention relates to a light source driving method for a projection apparatus.

2. Description of the Related Art

With the progress of modem video technology, projection apparatus has been widely used in home theater, small conference report, and studio discussion. The projection apparatus includes an optical engine and a projection lens, wherein the optical engine is used to provide an image light beam, and the projection lens is used to project the image light beam onto the screen, so as to form an image on the screen. In addition, the optical engine usually includes a light source, a light integrated rod module, and a light valve, wherein the light source is used to generate a light beam, the light integrated rod module is used to uniform the light beam, and the light valve is used to convert the light beam into the image light beam. In order to make the image projected by the projection apparatus have a relatively high brightness, many optical engines with dual-lamp structure are proposed. However, although the optical engine with dual-lamp structure improves the brightness of the image projected by the projection apparatus, a relatively large power is consumed.

SUMMARY OF THE INVENTION

Accordingly, the present invention is directed to provide a light source driving method, so as to reduce the power consumption of the light source and improve the uniformity of the image projected by the projection apparatus.

As embodied and broadly described herein, the present invention provides a light source driving method for controlling a first light source assembly and a second light source assembly of a projection apparatus to turn on and off at least once during each 1/n frame time. Each 1/n frame time consists of two first sub-frame periods, two second sub-frame periods, two third sub-frame periods, and two fourth sub-frame periods. The first light source assembly includes a plurality of first color light sources and a plurality of third color light sources, and the second light source assembly includes a plurality of second color light sources. The light source driving method includes following steps: turning on and off the first color light sources once sequentially in the first sub-frame period; turning on and off a part of the second color light sources once synchronously in the second sub-frame period; turning on and off the other second color light sources once synchronously in the third sub-frame period; and turning on and off the third color light sources once sequentially in the fourth sub-frame period. Here, the arrangement of the sequence of the first sub-frame periods, the second sub-frame periods, and the fourth sub-frame periods is adjusted as required.

As embodied and broadly described herein, the present invention further provides a light source driving method for controlling a first light source assembly and a second light source assembly of a projection apparatus to turn on and off at least once during each 1/n frame time. Each 1/n frame time consists of a first sub-frame period, a second sub-frame period, a third sub-frame period, a fourth sub-frame period, a fifth sub-frame period, and a sixth sub-frame period. The first light source assembly comprises a plurality of first color light sources and a plurality of third color light sources, and the second light source assembly comprises a plurality of second color light sources. The light source driving method comprises the following steps: turning on and off a part of the first color light sources once in the first sub-frame period; turning on and off a part of the second color light sources once in the second sub-frame period; turning on and off a part of the third color light sources once in the third sub-frame period; turning on and off the other first color light sources once in the fourth sub-frame period; turning on and off the other second color light sources once in the fifth sub-frame period; and turning on and off the other third color light sources once in the sixth sub-frame period. Here, the arrangement of the sequence of the first sub-frame period, the second sub-frame period, the third sub-frame period, the fourth sub-frame period, the fifth sub-frame period, and the sixth sub-frame period is adjusted as required.

The light source driving method of the present invention redistributes the time for turning on and off each light source, so that all the light sources turn on and off in turn, and the power consumption of the light source assembly of the projection apparatus is reduced.

Other objectives, features and advantages of the present invention will be further understood from the further technology features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve for explaining the principles of the invention.

DESCRIPTION OF THE EMBODIMENTS

It is to be understood that other embodiments may be utilized and structural changes may be made without departing from the scope of the present invention. Also, it is to be understood that the phraseology and terminology used herein is for the purpose of description and should not be regarded as limiting. The use of "including," and "comprising," and variations thereof herein is meant to encompass the items listed thereafter and equivalents thereof as well as additional items.

Figure 1:
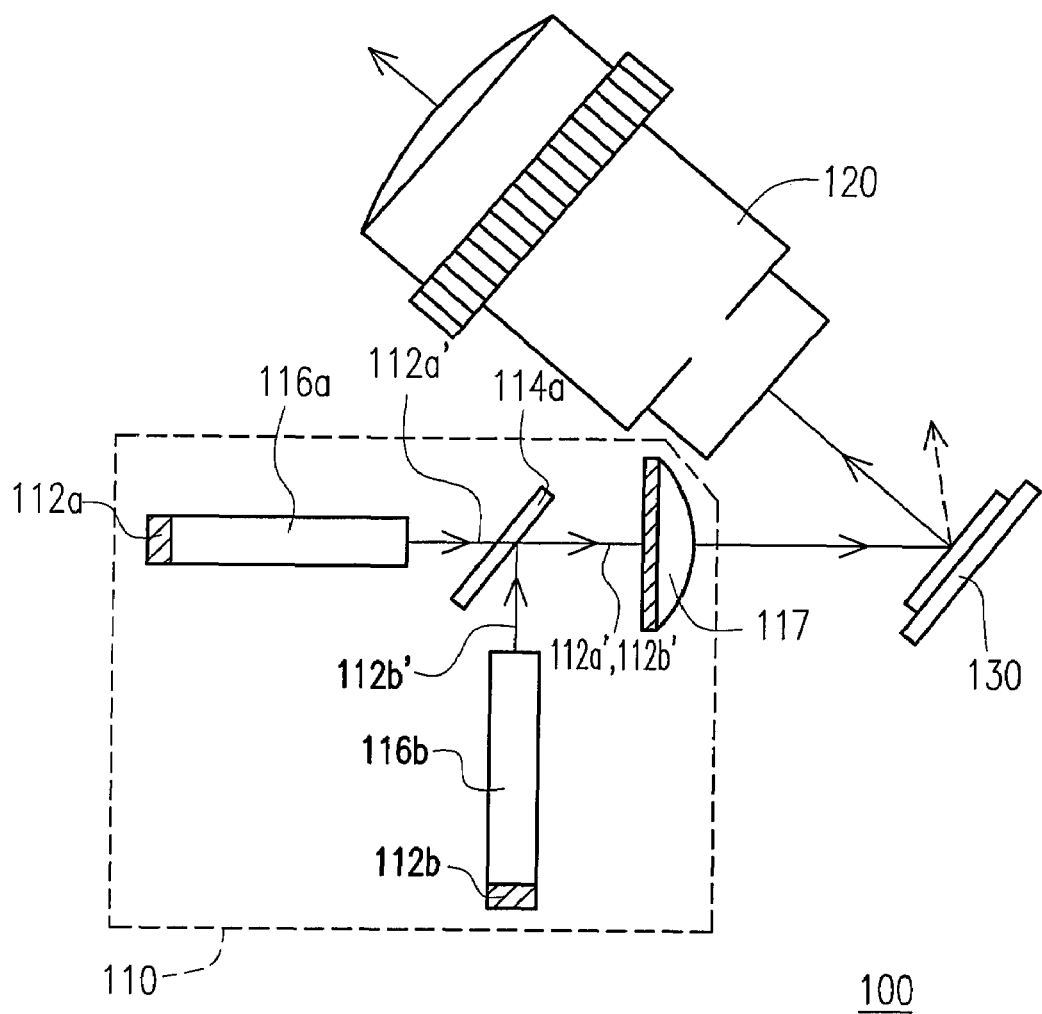
FIG. 1 is a schematic view of a projection apparatus according to an embodiment of the present invention.

Referring to FIG. 1, a projection apparatus 100 of an embodiment of the present invention includes an illumination system 110, a projection lens 120, and a light valve 130. The light valve 130 is disposed between the illumination system 110 and the projection lens 120. The illumination system 110 includes a first light source assembly 112a, a second light source assembly 112b, a filter 114a, a first light integrated rod 116a, and a second light integrated rod 116b. The first light source assembly 112a is adapted to provide a first light beam 112a', the second light source assembly 112b is adapted to provide a second light beam 112b', and the first light beam 112a' and the second light beam 112b' are of different spectrums. The filter 114a is disposed on the transmission path of the first light beam 112a' and the second light beam 112b', and the filter 114a is capable of reflecting the second light beam 112b' and permitting the first light beam 112a' to pass through. The transmission path of the second light beam 112b' reflected by the filter 114a is the same as that of the first light beam 112a' passing though the filter 114a. In addition, the first light integrated rod 116a is disposed between the first light source assembly 112a and the filter 114a, and the second light integrated rod 116b is disposed between the second light source assembly 112b and the filter 114a. In addition to the rectangular rods as shown in FIG. 1, the first light integrated rod 116a and the second light integrated rod 116b are also tapered column rods.

In the projection apparatus 100, the illumination system 110 further includes a lens 117 disposed between the filter 114a and the light valve 130. Moreover, the first light beam 112a' provided by the first light source assembly 112a is condensed on the light valve 130 via the lens 117 after passing through the filter 114a, and the second light beam 112b' provided by the second light source assembly 112b is condensed on the light valve 130 via the lens 117 after being reflected by the filter 114a. When the first light source assembly 112a and the second light source assembly 112b emit light simultaneously, the second light beam 112b' is combined with the first light beam 112a' after being reflected by the filter 114a, and the first light beam 112a' and the second light beam 112b' are transmitted to the light valve 130 simultaneously. The light valve 130 is a digital micro-mirror device (DMD) or a reflective liquid crystal on silicon (LCOS) panel. In this embodiment, the light valve 130 is, for example, the DMD having a plurality of micro-mirrors (not shown), wherein the micro-mirror in "ON" state reflects the first light beam 112a' and the second light beam 112b' to the projection lens 120, and the micro-mirror in "OFF" state offsets the first light beam 112a' and the second light beam 112b' from the projection lens 120. Then, the first light beam 112a' and the second light beam 112b' reflected to the projection lens 120 are projected on the screen (not shown), so as to display the image.

Figure 2:
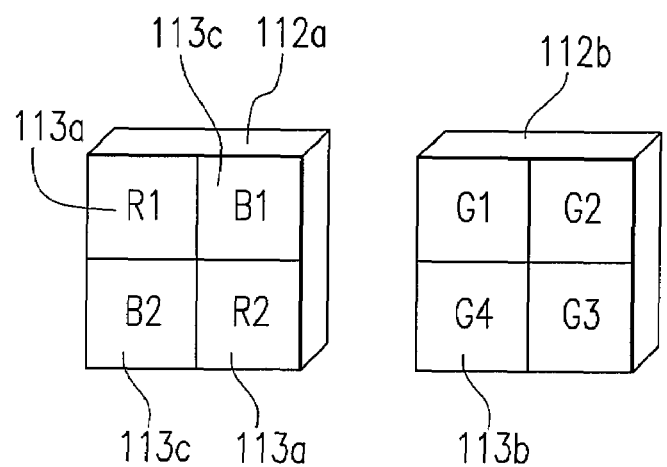
FIG. 2 is a schematic view of a first light source assembly and a second light source assembly in FIG. 1.

Referring to FIG. 2, the first light source assembly 112a includes a plurality of first color light sources 113a and a plurality of third color light sources 113c, and the second light source assembly 112b includes a plurality of second color light sources 113b. The light sources are light emitting diodes (LEDs), for example. In this embodiment, the first color light source 113a includes a first red light source R1 and a second red light source R2. The third color light source 113c includes a first blue light source B1 and a second blue light source B2. The second color light source 113b includes a first green light source G1, a second green light source G2, a third green light source G3, and a fourth green light source G4. The filter 114a is capable of, for example, reflecting the green light, and permitting the red light and the blue light to pass through the filter 114a. In other words, the first light beam 112a' is red light or blue light, the second light beam 112b' is green light, and the projection apparatus 100 of this embodiment generates the fall color image by the arrangement of the red light, the blue light, and the green light.

It should be noted that the colors of the first color light source 113a, the second color light source 113b, and the third color light source 113c are used for illustration, and are not used to limit the scope of the present invention. In other words, the first color light source 113a, the second color light source 113b, and the third color light source 113c are a green light source, a red light source, and a blue light source respectively, or are a red light source, a blue light source, and a green light source respectively. Moreover, the filer 114a is placed by a appropriate one along with the changes of the colors of the first color light source 113a and the second color light source 113b, so as to make the first light beam 112a' and the second light beam 112b' be transmitted to the light valve 130.

Figure 3:
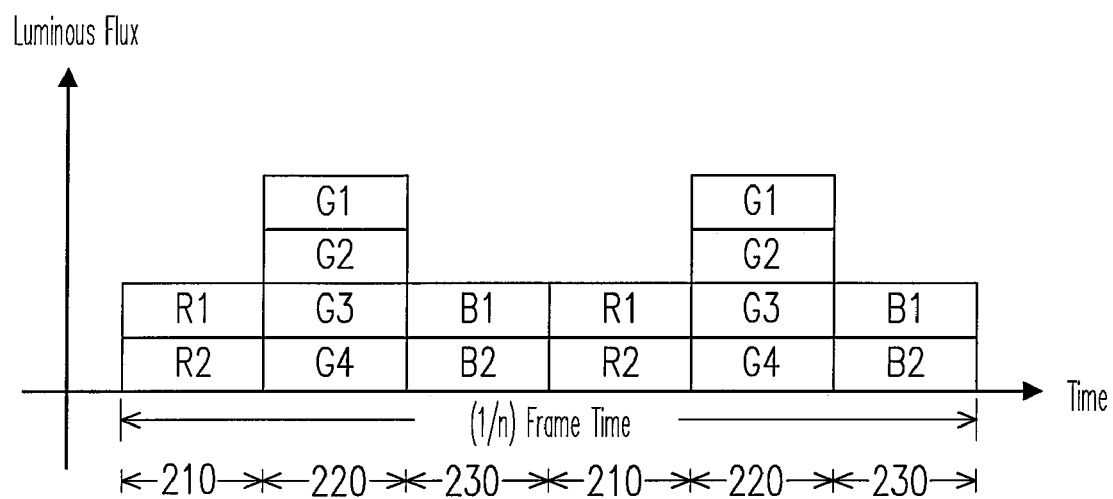
FIG. 3 is a schematic view of a light source driving method according to an embodiment of the present invention.

FIG. 3 is a schematic view of a light source driving method of the first light source assembly and the second light source assembly of FIG. 2. Referring to FIG. 3, the vertical axis is the luminous flux of the light beam emitted by the illumination system 110, and the horizontal axis is time. The light source driving method according to this embodiment of the present invention includes the following steps. Each 1/n frame time is divided into six sub-frame periods, and each sub-frame period equals to 1/6n frame time. Each 1/n frame time consists of two first sub-frame periods 210, two second sub-frame periods 220, and two third sub-frame periods 230, where n is, for example, a positive integer e.g. 2. Next, in the first sub-frame period 210, the first red light source R1 and the second red light source R2 are turned on and off once synchronously. In the second sub-frame period 220, the first green light source G1, the second green light source G2, the third green light source G3, and the fourth green light source G4 are turned on and off once synchronously. In the third sub-frame period 230, the first blue light source B1 and the second blue light source B2 are turned on and off once synchronously. Then, the lighting procedures performed in the first sub-frame period 210, the second sub-frame period 220, and the third sub-frame period 230 are repeated sequentially. Thus, after the light sources are reflected by the light valve 130, the full color image is generated based on the time-multiplexing color mixture principle.

Generally, the light source driving method in FIG. 3 obtains a quite high brightness of the image projected by the projection apparatus 100, and the light source driving method in FIG. 3 is usually capable of being applied in normal operating mode that the projection apparatus 100 is electrically connected an external power source. The light source driving method for the projection apparatus 100 using batteries as the power source (i.e. power-saving mode) is illustrated below.

Figure 4:
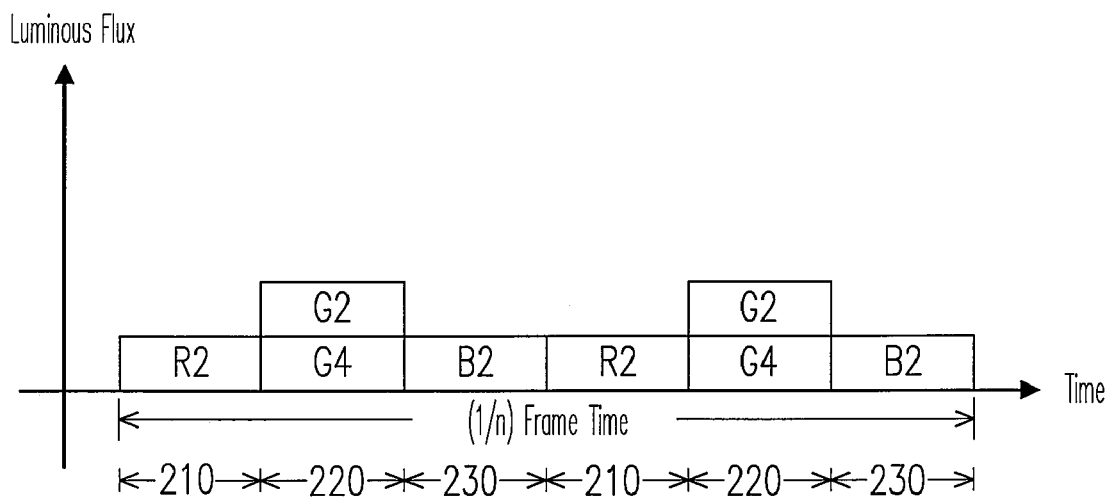
FIG. 4 is a schematic view of the light source driving method according to an embodiment of the present invention in power-saving mode.

FIG. 4 is a schematic view of a light source driving method of the first light source assembly and the second light source assembly in power-saving mode. Referring to FIG. 4, in the first sub-frame period 210, only the second red light source R2 is turned on and off once, and the first red light source R1 remains off. In the second sub-frame period 220, only the second green light source G2 and the fourth green light source G4 are turned on and off once synchronously, and the first green light source G1 and the third green light source G3 remain off. In the third sub-frame period 230, only the second blue light source B2 is turned on and off once, and the first blue light source B1 remains off. Compared with the light source driving method in FIG. 2, in the light source driving method in FIG. 4, only half of the light sources are turned on in each 1/n frame time, thereby reducing the power consumption.

Figure 5A:
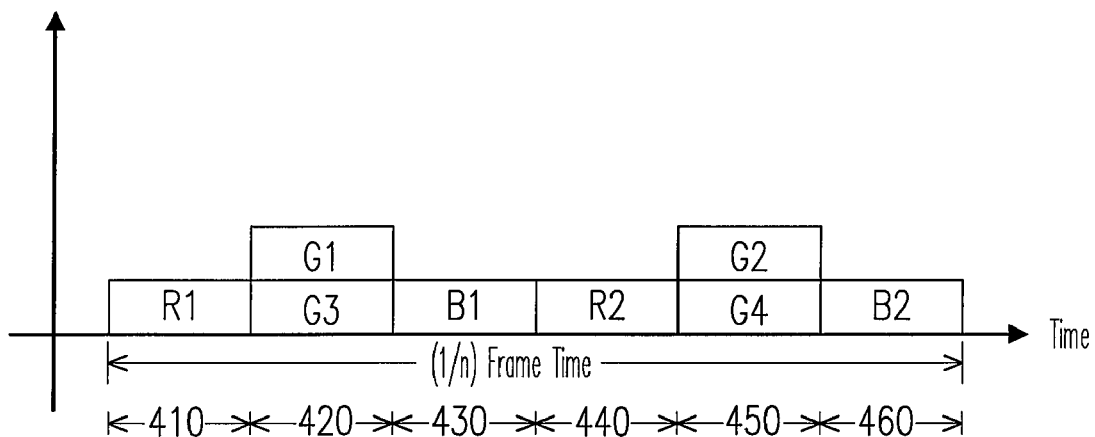
FIGS. 5A to 5C are schematic views of the light source driving method according to another embodiment of the present invention in power-saving mode.
Figure 5B:
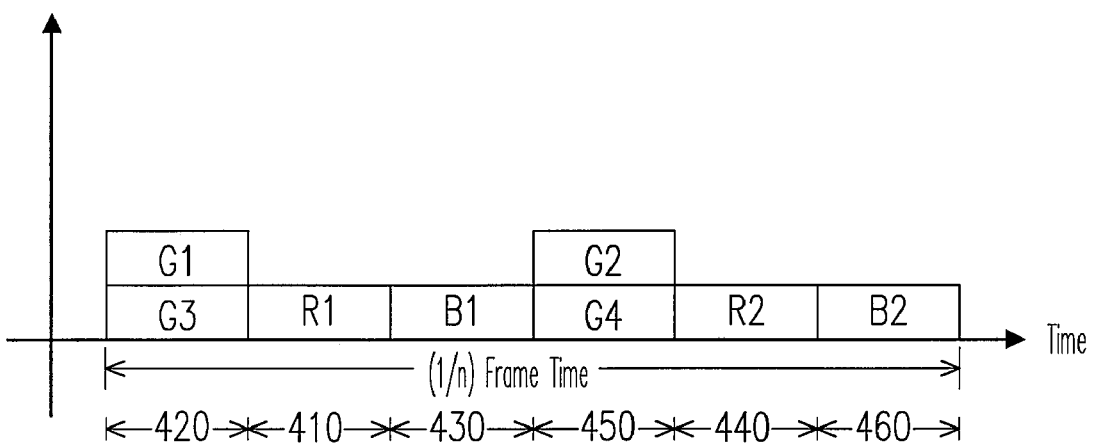
Figure 5C:
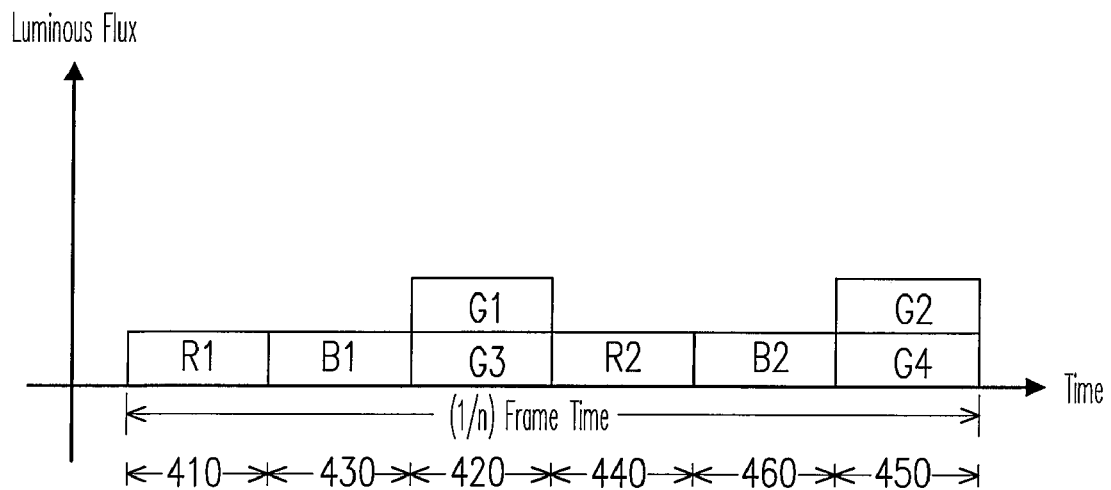

FIGS. 5A to 5C are schematic views of the light source driving method according to another embodiment of the present invention. Referring to FIG. 5A, the vertical axis is the luminous flux of the light emitted by the illumination system 110, and the horizontal axis is time. The light source driving method includes the following steps. Each 1/n frame time is divided into six sub-frame periods, and each sub-frame period equals to 1/6n frame time. Each 1/n frame time consists of a first sub-frame period 410, a second sub-frame period 420, a third sub-frame period 430, a fourth sub-frame period 440, a fifth sub-frame period 450, and a sixth sub-frame period 460, where n is, for example, a positive integer e.g. 2. Then, in the first sub-frame period 410, the first red light source R1 is turned on and off once. In the second sub-frame period 420, the first green light source G1 and the third green light source G3 are turned on and off once synchronously. In the third sub-frame period 430, the first blue light source B1 is turned on and off once. In the fourth sub-frame period 440, the second red light source R2 is turned on and off once. In the fifth sub-frame period 450, the second green light source G2 and the fourth green light source G4 are turned on and off once synchronously. In the sixth sub-frame period 460, the second blue light source B2 is turned on and off once. Then, the lighting procedures performed in the first sub-frame period 410 to the six sub-frame period 460 are repeated in the above sequence. Compared with the light source driving method in FIG. 3, in the light source driving method of this embodiment, only half of the light sources are turned on in each sub-frame period, so that the light source driving method of this embodiment is quite power-saving and is capable of being applied in the projection apparatus 100 using batteries as the power source. Moreover, the light source driving method of this embodiment involves turning on each light source once in the 1/n frame time. Compared with the light source driving method of FIG. 4 that only a part of the light sources are turned on once in the 1/n frame, the light source driving method of this embodiment provides a better spatial uniformity of the image projected by the projection apparatus 100.

The sequence of the sub-frame periods is not limited in the present invention, and the sequence of the sub-frame periods in FIG. 5A is changed freely. For example, the sequence of the first sub-frame period 410 and the second sub-frame period 420 are interchanged, as shown in FIG. 5B. Alternatively, the second sub-frame period 420 and the third sub-frame period 430 are interchanged, as shown in FIG. 5C.

Figure 6A:
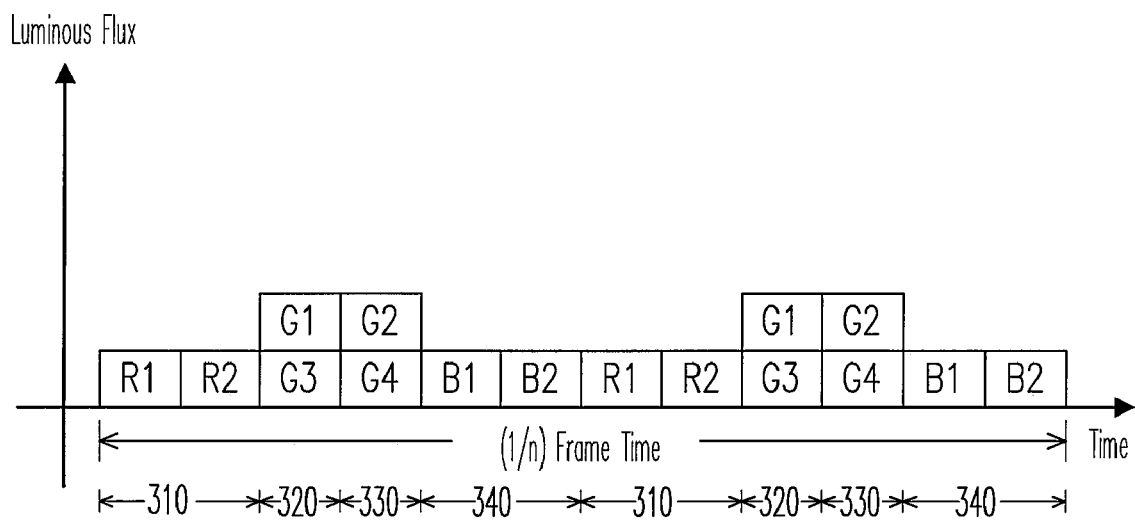
FIGS. 6A to 6C are schematic views of the light source driving method according to still another embodiment of the present invention in power-saving mode.
Figure 6B:
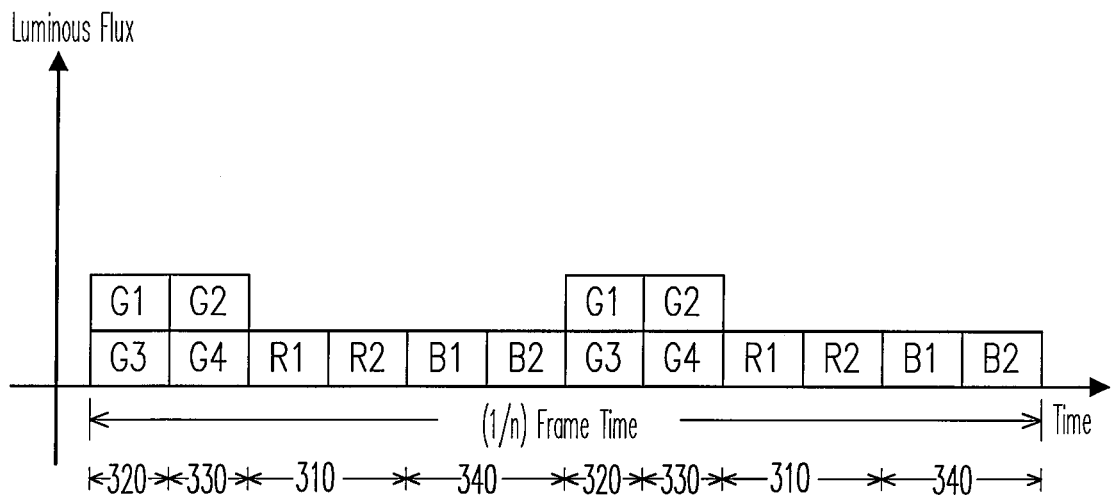
Figure 6C:
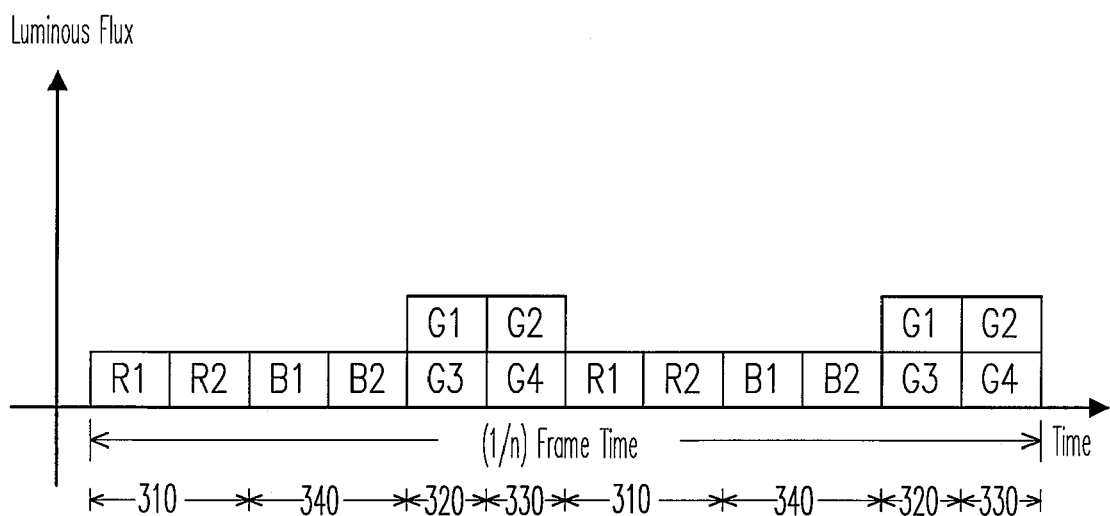

FIGS. 6A to 6C are schematic views of the light source driving method according to another embodiment of the present invention. Firstly, referring to FIG. 6A, the vertical axis is the luminous flux of the light beam emitted by the illumination system 110, and the horizontal axis is time. The light source driving method according to this embodiment of the present invention includes the following steps. Each 1/n frame time is divided into eight sub-frame periods, and each sub-frame period equals to 1/6n frame. Each 1/n frame time consists of two first sub-frame periods 310, two second sub-frame periods 320, two third sub-frame periods 330, and two fourth sub-frame periods 340. The first sub-frame period 310 and the fourth sub-frame period 340 equal to 1/6n frame time, and the second sub-frame period 320 and the third sub-frame period 330 equal to 1/12n frame, where n is, for example, a positive integer e.g. 2. Then, in a first sub-frame period 310, the first red light source R1 and the second red light source R2 are turned on and off once sequentially. In the second sub-frame period 320, the first green light source G1 and the third green light source G3 are turned on and off once synchronously. In the third sub-frame period 330, the second green light source G2 and the fourth green light source G4 are turned on and off once synchronously. In the fourth sub-frame period 340, the first blue light source B1 and the second blue light source B2 are turned on and off once sequentially. Then, the lighting procedures performed in the first sub-frame 310 to the fourth sub-frame 340 are repeated sequentially.

The sequence of the sub-frame periods is not limited in the present invention, and the orders of the sub-frame periods as shown in FIG. 6A are changed freely. For example, the sequence of the first sub-frame 310 and the second and the third sub-frames 320, 330 are interchanged, as shown in FIG. 6B. Alternatively, the second and the third sub-frame periods 320, 330 and the fourth sub-frame 340 are interchanged, as shown in FIG. 6C.

In view of the above, the light source driving method of the present invention redistributes the time for turning on and off each light source, so that all the light sources turn on and off in turn, and the power consumption of the light source assembly of the projection apparatus is reduced, thereby providing a better spatial uniformity of the image projected by the projection apparatus. Moreover, the light source driving method of the present invention makes the projection apparatus use batteries as the power source to operate in power-saving mode.

The foregoing description of the preferred embodiment of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like is not necessary limited the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A light source driving method for controlling a first light source assembly and a second light source assembly of a projection apparatus to turn on and off at least once during each 1/n frame time, each 1/n frame time consisting of two first sub-frame periods, two second sub-frame periods, two third sub-frame periods, and two fourth sub-frame periods, the first light source assembly comprising a plurality of first color light sources and a plurality of third color light sources, and the second light source assembly comprising a plurality of second color light sources, the light source driving method comprising:

turning on and off the first color light sources once sequentially in the first sub-frame period;

turning on and off a part of the second color light sources once synchronously in the second sub-frame period;

turning on and off the other second color light sources once synchronously in the third sub-frame period; and turning on and off the third color light sources once sequentially in the fourth sub-frame period;

wherein each of the first sub-frame period and the fourth sub-frame period equals to 1/6n frame, and each of the second sub-frame period and the third sub-frame period equals to 1/12n frame time, where n is a positive integer.

2. The light source driving method as claimed in claim 1, wherein n=2.

3. The light source driving method as claimed in claim 1, wherein the first color light sources are red light sources, the second color light sources are green light sources, the third color light sources are blue light sources, and the color light sources are light emitting diodes.

4. A light source driving method for controlling a first light source assembly and a second light source assembly of a projection apparatus to turn on and off at least once during each 1/n frame time, each 1/n frame time consisting of a first sub-frame period, a second sub-frame period, a third sub-frame period, a fourth sub-frame period, a fifth sub-frame period, and a sixth sub-frame period, the first light source assembly comprising a plurality of first color light sources and a plurality of third color light sources, and the second light source assembly comprising a plurality of second color light sources, the light source driving method comprising:

turning on and off a part of the first color light sources once in the first sub-frame period;

turning on and off a part of the second color light sources once in the second sub-frame period;

turning on and off a part of the third color light sources once in the third sub-frame period;

turning on and off the other part of first color light sources once in the fourth sub-frame period;

turning on and off the other part of second color light sources once in the fifth sub-frame period; and turning on and off the other part of third color light sources once in the sixth sub-frame period.

5. The light source driving method as claimed in claim 4, wherein each of the first sub-frame period, second sub-frame period, third sub-frame period, fourth sub-frame period, fifth sub-frame period, and sixth sub-frame period equals to 1/6n frame time, where n is a positive integer.

6. The light source driving method as claimed in claim 5, wherein n=2.

7. The light source driving method as claimed in claim 4, wherein the first color light sources are red light sources, the second color light sources are green light sources, the third color light sources are blue light sources, and the color light sources are light emitting diodes.

\* \* \* \* \*